(12) United States Patent
Yokota et al.

(10) Patent No.: US 7,136,203 B2
(45) Date of Patent: Nov. 14, 2006

(54) IMAGE SENSOR AND IMAGE READING APPARATUS

(75) Inventors: Masahiko Yokota, Chiba (JP); Haruo Ishizuka, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/271,730

(22) Filed: Nov. 9, 2005

(65) Prior Publication Data

US 2006/0077480 A1    Apr. 13, 2006

Related U.S. Application Data

(63) Continuation of application No. 09/925,856, filed on Aug. 9, 2001, now Pat. No. 7,042,599.

(30) Foreign Application Priority Data

| Aug. 11, 2000 | (JP) | ............................. 2000-245180 |
| Aug. 11, 2000 | (JP) | ............................. 2000-245189 |
| Aug. 11, 2000 | (JP) | ............................. 2000-245190 |

(51) Int. Cl.
*H04N 1/04* (2006.01)

(52) U.S. Cl. .................. 358/484; 358/475; 358/483; 358/497; 358/496; 358/474; 250/208.1; 250/227.11; 250/234; 250/215; 399/220

(58) Field of Classification Search ............... 358/484, 358/483, 482, 497, 475, 474, 496, 494, 408, 358/487, 509, 505, 512–514, 506; 250/234–236, 250/208.1, 216, 227.11, 227.26; 355/67, 355/68, 70; 359/196, 197, 205, 209
See application file for complete search history.

(56) References Cited

U.S. PATENT DOCUMENTS

| 4,728,995 | A | 3/1988 | Matsuda |
| 4,930,008 | A | 5/1990 | Suzuki et al. |
| 5,019,897 | A | 5/1991 | Shirata et al. |
| 5,489,992 | A | 2/1996 | Endo |
| 5,581,076 | A | 12/1996 | Tabata |
| 6,081,351 | A | 6/2000 | Tabata |
| 6,259,082 | B1 | 7/2001 | Fujimoto et al. |
| 6,295,141 | B1 | 9/2001 | Ogura et al. |
| 6,333,779 | B1 | 12/2001 | Tabata et al. |
| 6,357,903 | B1 | 3/2002 | Furusawa et al. |
| 6,496,285 | B1 | 12/2002 | Fujimoto et al. |
| 6,563,611 | B1 | 5/2003 | Kao |
| 6,573,487 | B1 | 6/2003 | Matsumoto |

(Continued)

FOREIGN PATENT DOCUMENTS

JP    63-125461    8/1988

(Continued)

OTHER PUBLICATIONS

Copy of Office Action dated Mar. 4, 2003 from Japanese Patent Application No. 2000-245190.

(Continued)

*Primary Examiner*—Cheukfan Lee
(74) *Attorney, Agent, or Firm*—Morgan & Finnegan LLP

(57) ABSTRACT

In a contact type image sensor including an illumination section including a light source and light guide to illuminate a document, an image sensing element for converting an optical image of the document into an electrical signal, a cylindrical rod lens for forming an optical image on the image sensing element, and a frame for integrally holding the illumination section, image sensing element, and cylindrical rod lens, the light guide has undergone antireflection treatment on a surface thereof on the document side.

6 Claims, 18 Drawing Sheets

U.S. PATENT DOCUMENTS

| | | |
|---|---|---|
| 6,612,730 B1 | 9/2003 | Ikeda |
| 6,661,497 B1 | 12/2003 | Tabata et al. |
| 6,724,503 B1 | 4/2004 | Sako et al. |
| 6,744,033 B1 | 6/2004 | Ikeda |
| 6,783,254 B1 | 8/2004 | Fujino et al. |
| 6,808,280 B1 * | 10/2004 | Uemura et al. ............. 362/604 |
| 6,816,624 B1 | 11/2004 | Ebisawa et al. |
| 6,892,945 B1 | 5/2005 | Shishido |
| 6,902,309 B1 * | 6/2005 | Uemura et al. ............. 362/555 |
| 6,917,453 B1 * | 7/2005 | Onishi et al. ............. 358/483 |
| 7,042,599 B1 * | 5/2006 | Yokota et al. ............. 358/475 |

FOREIGN PATENT DOCUMENTS

| | | |
|---|---|---|
| JP | 64-30961 | 2/1989 |
| JP | 1-171363 | 7/1989 |
| JP | 5-025871 | 4/1993 |
| JP | 5-167053 A | 7/1993 |
| JP | 7-162587 | 6/1995 |
| JP | 7-203129 A | 8/1995 |
| JP | 8-172512 A | 7/1996 |
| JP | 08-279885 | 10/1996 |
| JP | 10-271278 A | 10/1998 |
| JP | 10-304155 | 11/1998 |
| JP | 11-046282 | 2/1999 |
| JP | 11-46282 | 2/1999 |
| JP | 11-055464 | 2/1999 |
| JP | 11-084544 | 3/1999 |
| JP | 11-215302 | 8/1999 |
| JP | 2000-115470 A | 4/2000 |
| JP | 2000-125081 A | 4/2000 |
| JP | 2001-268320 | 9/2001 |

OTHER PUBLICATIONS

Copy of Final Rejection dated Jul. 15, 2003 from Japanese Patent Application No. 2000-245189.
Copy of Office Action dated Oct. 8, 2002 from Japanese Patent Application No. 2000-245189.
English Abstract for JPA 5-167053.
English Abstract for JPA 7-203129.
English Abstract for JPA 8-172512.
English Abstract for JPA 10-271278.
English Abstract for JPA 11-084544.
English Abstract for JPA 2000-125081.
English Abstract for JPA 08-279885.
Office Action issued by Japanese Patent Office on Feb. 24, 2004 in Counterpart Japanese Patent Application No. 2000-245190.
English Abstract for JPA 11,215302 (item A).
Notification issued in counterpart Japanese Patent application 2000-245180, dated May 17, 2005.
English Abstract for JPA 1-171363.
English Abstract for JPA 2000-115470.

* cited by examiner

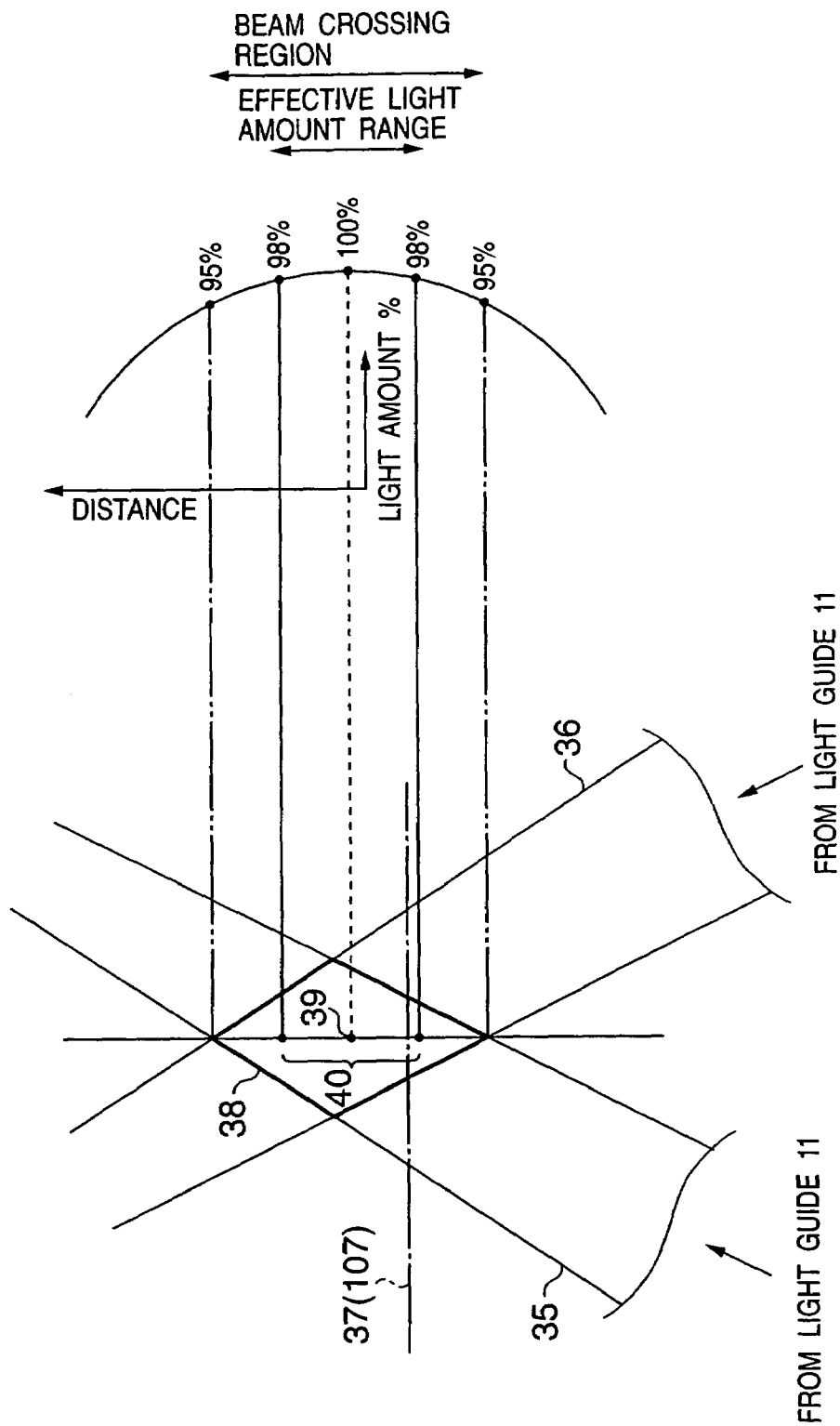

IMAGE SENSOR AND IMAGE READING APPARATUS

This is a continuation of U.S. Pat. Ser. No. 09/925,856 filed Aug. 9, 2001 now U.S. Pat. No. 7,042,599.

FIELD OF THE INVENTION

The present invention relates to an image sensor unit and an image reading apparatus such as an image scanner, facsimile apparatus, or copying machine using the image sensor unit.

BACKGROUND OF THE INVENTION

As a conventional copying machine, composite apparatus having both copying and facsimile functions, or image scanner having an automatic document feeder (ADF), there has been proposed an apparatus having both a function of scanning a document fixed on a glass surface and a function of scanning a document by moving the document (feed reading).

For example, in an image reading section shown in FIG. 14, a contact type image sensor (CIS) 1 serving as an image reading device is arranged below platen glass 2. This arrangement makes it possible to perform a method of reading a stationary document D placed on the platen glass 2 while the CIS 1 is kept moving along the subscanning direction and a method of reading a document D fed along the CIS 1 kept stopped at the position of second glass 2a.

The arrangement of a conventional contact type image sensor will be described below. FIG. 15A is a perspective view showing the arrangement of the conventional contact type image sensor 1. FIG. 15B is a sectional view of the contact type image sensor 1. The contact type image sensor 1 shown in FIG. 15A has an LED array 4 serving as a light source made up of a plurality of arrayed LEDs 3. The pair of LED arrays 4 are disposed on the two sides of a cylindrical rod lens array 5. A one-dimensional light-receiving element array 6 is disposed below the cylindrical rod lens array 5. These members are laid out in a frame 7. Cover glass 8 is attached to the upper portion of the image sensor 1.

Light emitted from the LEDs 3 irradiates the stationary document D placed on the platen glass 2, as shown in FIG. 15B. Light reflected by the document D is focused on the one-dimensional light-receiving element array 6 such as a CCD through the cylindrical rod lens array 5.

FIG. 16A is a perspective view showing the arrangement of another conventional contact type image sensor. As shown in FIG. 16A, this image sensor includes an LED 3 serving as light guide source and a light guide 11 for guiding light from the LED 3 to a document. The LED 3 is fixed on one of the longitudinal end portions of the light guide 11 (one LED at the left end in the illustrated example). Light emitted from the LED 3 is repeatedly reflected and propagates in the light guide 11 and emerges along the entire length of the light guide 4.

The light emerging from the light guide 11 irradiates the stationary document D placed on the platen glass 2, as shown in FIG. 16B. The light is then focused on a one-dimensional light-receiving element array 6 such as a CCD through a cylindrical rod lens array 5. These image sensor constituent members are laid out in a frame 7.

A conventional image sensor reciprocates in directions indicated by a double-headed arrow A as shown in FIG. 14. The image sensor is moved to the end portion of the image reading section, as indicated by a dotted line at the reading range end position. As shown in FIG. 17, a frame 9 for supporting the platen glass 2 is disposed at this end portion. When the image sensor 1 further moves, it collides with the frame 9. In order to prevent this collision according to the conventional case, the reading range end position is inevitably set before this collision position. This results in a large apparatus and particularly a large image reading section.

In the conventional image sensors like the ones shown in FIGS. 15B and 16B, when a document is irradiated from the lower side, and reflected light is incident on the one-dimensional light-receiving array 6 through the cylindrical rod lens array 5, light preferably irradiates the document placed on the platen glass 2 such that the light amount of the irradiation light beam has a peak for the document D. When the document floats from the platen glass 2, the position of the document is shifted from the light amount peak position. This makes it difficult to assure a sufficient light amount. In addition, unevenness occurs in the read image due to variations in light amount.

In the conventional image sensor shown in FIG. 16A, the LED 3 is formed at only one end of the light guide 11. In this case, a uniform light amount distribution within the illumination range is difficult to obtain, resulting in a nonuniform intensity. Generally, the farther the distance from the LED 3 increases, the smaller the light amount in the light amount distribution, as shown in FIG. 18. Since the LED 3 is arranged on only one side of the light guide 11, the absolute light amount is short to result in a decrease in scanning speed. In addition, nonuniformity in light amount distribution occurs to make it difficult to obtain an excellent image. For example, when a photograph or the like is adhered to a document and its image is to be read, the document is irradiated from one side opposite to the illumination direction, and a linear shadow or the like appears along the edge of the photograph in the read image.

As for the image sensor shown in FIG. 15A, it uses a large number of LEDs 3 to result in high cost. Further, it is difficult to obtain an excellent image due to variations in light amounts of the respective LEDs 3. In order to prevent color irregularity in reading operation, only a monochrome light source can be used.

SUMMARY OF THE INVENTION

The present invention has been made in consideration of the above situation, and has as its first object of the present invention to provide an image sensor unit capable of assuring an optimal and uniform light amount and obtaining an excellent image, and an image reading apparatus using the image sensor unit.

Further, it is the second object of the present invention to provide an image sensor unit capable of realizing optimal image reading and effectively realizing compactness, and an image reading apparatus having the image sensor unit.

According to the present invention, the foregoing first object is attached by providing an image sensor unit comprising: an illumination section including a light source and light guide to illuminate a document; an image sensing element for converting an optical image of the document into an electrical signal; a cylindrical lens for focusing the optical image on the image sensing element; and a frame for integrally holding the illumination section, the image sensing element, and the lens, wherein the light guide has undergone antireflection treatment on a surface thereof on the document side.

According to the present invention, to achieve the foregoing second object, a distance from the image sensing element to the surface of the light guide on the document side is made shorter than a distance from the image sensing element to an end of the lens on the document side.

Further, the foregoing first object is also attained by providing an image sensor unit comprising: a pair of illumination sections each including a light source and light guide to illuminate a document; an image sensing element for converting an optical image of the document into an electrical signal; a cylindrical lens for focusing the optical image on the image sensing element; and a frame for integrally holding the illumination sections, the image sensing element, and the lens, wherein the illumination sections are so disposed as to sandwich the lens, the light guides have exit ports for making light from the light sources emerge toward the document, and the exit ports are formed such that a peak of exit light is farther than a focal position of the lens for the image sensing element with respect to the image sensing element, and the focal position is included in a beam crossing region of exit beams from the pair of illumination sections.

Further, the foregoing first object is also attained by providing an image reading apparatus comprising: one of the aforesaid image sensor units; and a moving mechanism for moving a relative position between the image sensor unit and the document, wherein the document is scanned by relative movement between the image sensor unit and the document.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 11A and 11B are views showing the relationship between the light beam of an image sensor unit and its light amount distribution according to a second embodiment of the present invention;

DETAILED DESCRIPTION OF THE PREFERRED EMBODIMENTS

Preferred embodiments of the present invention will be described in detail in accordance with the accompanying drawings.

<First Embodiment>

Figure 1:
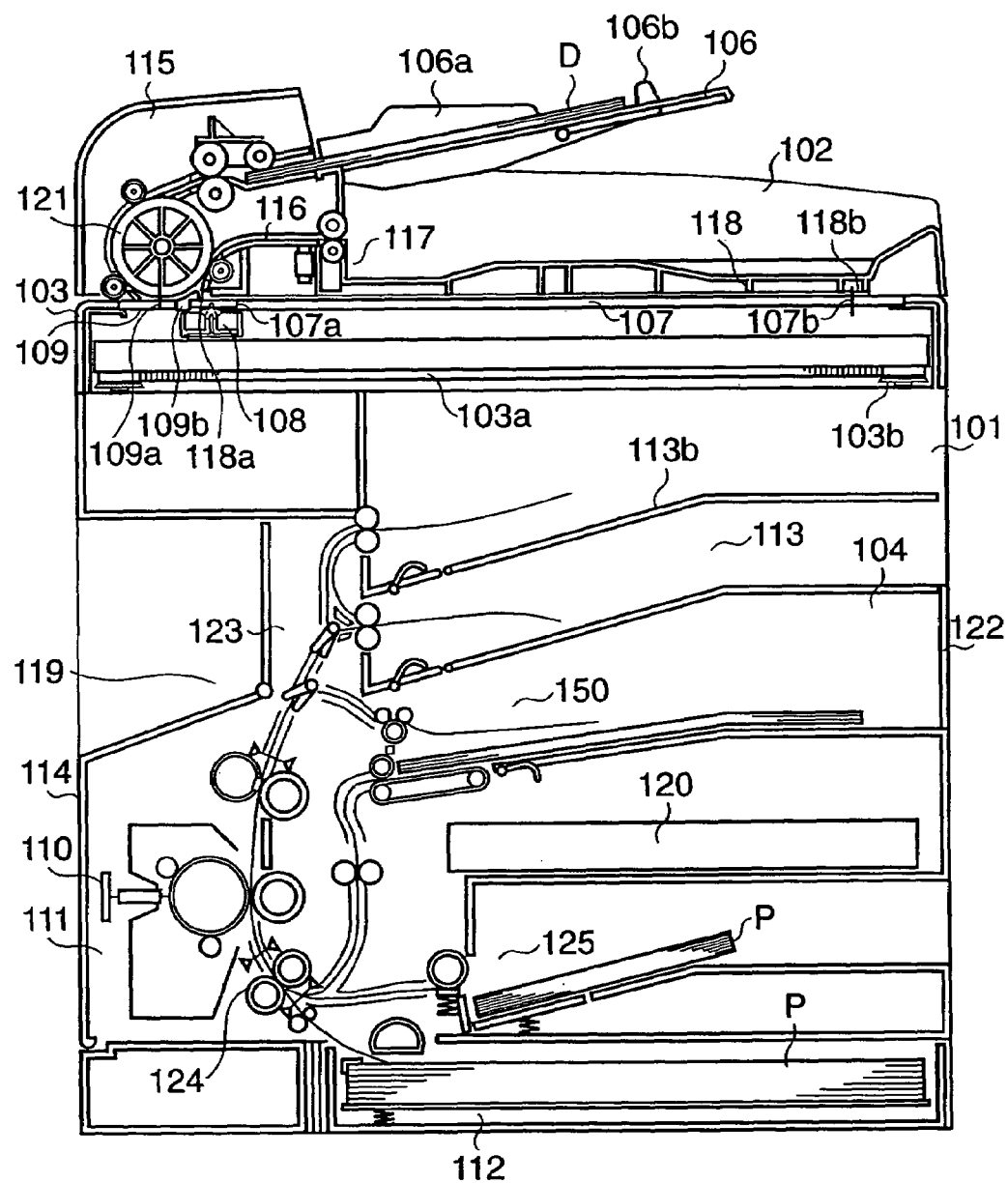
FIG. 1 is a schematic view showing an internal arrangement of a facsimile apparatus according to an embodiment of the present invention.
Figure 2:
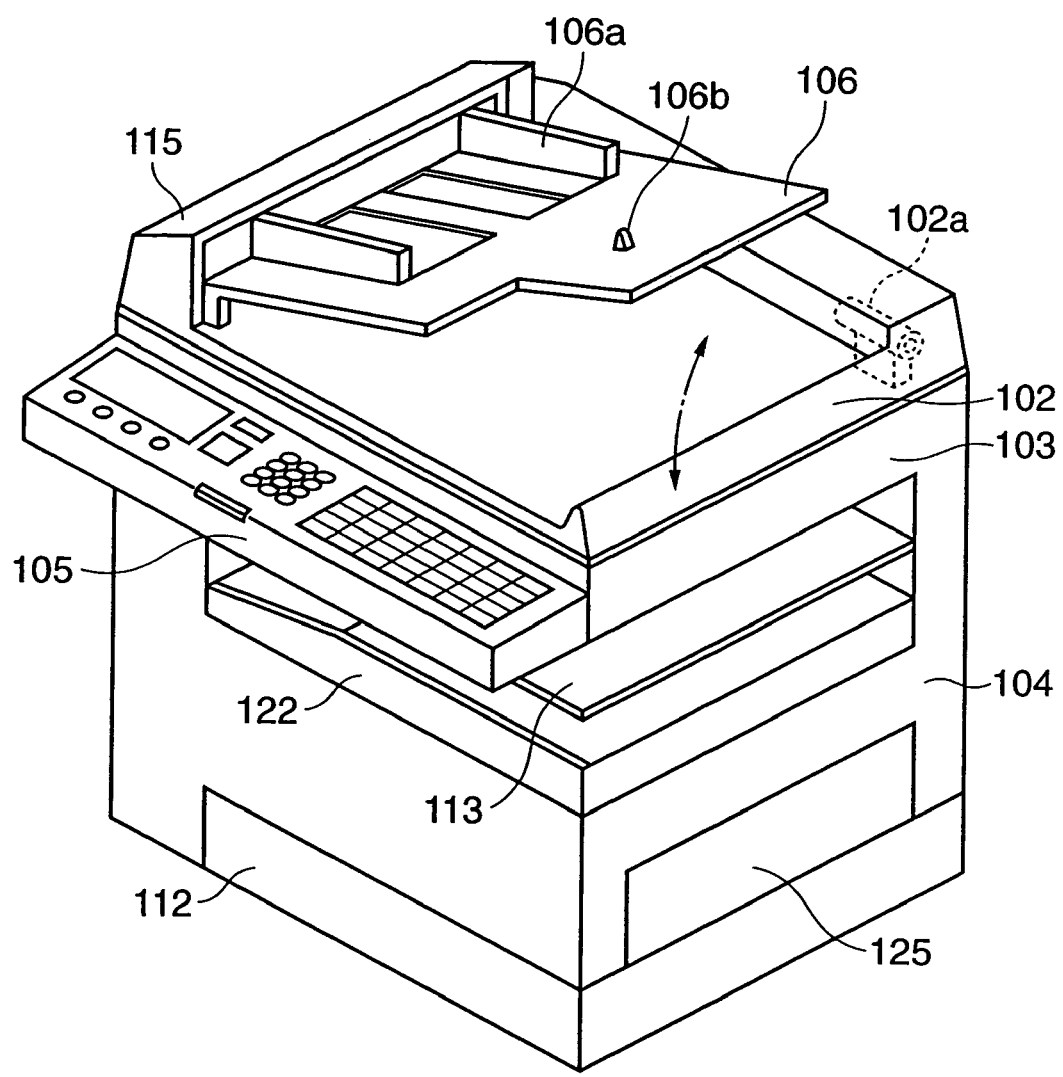
FIG. 2 is a perspective view showing an outer appearance of the facsimile apparatus according to the embodiment of the present invention.
Figure 3:
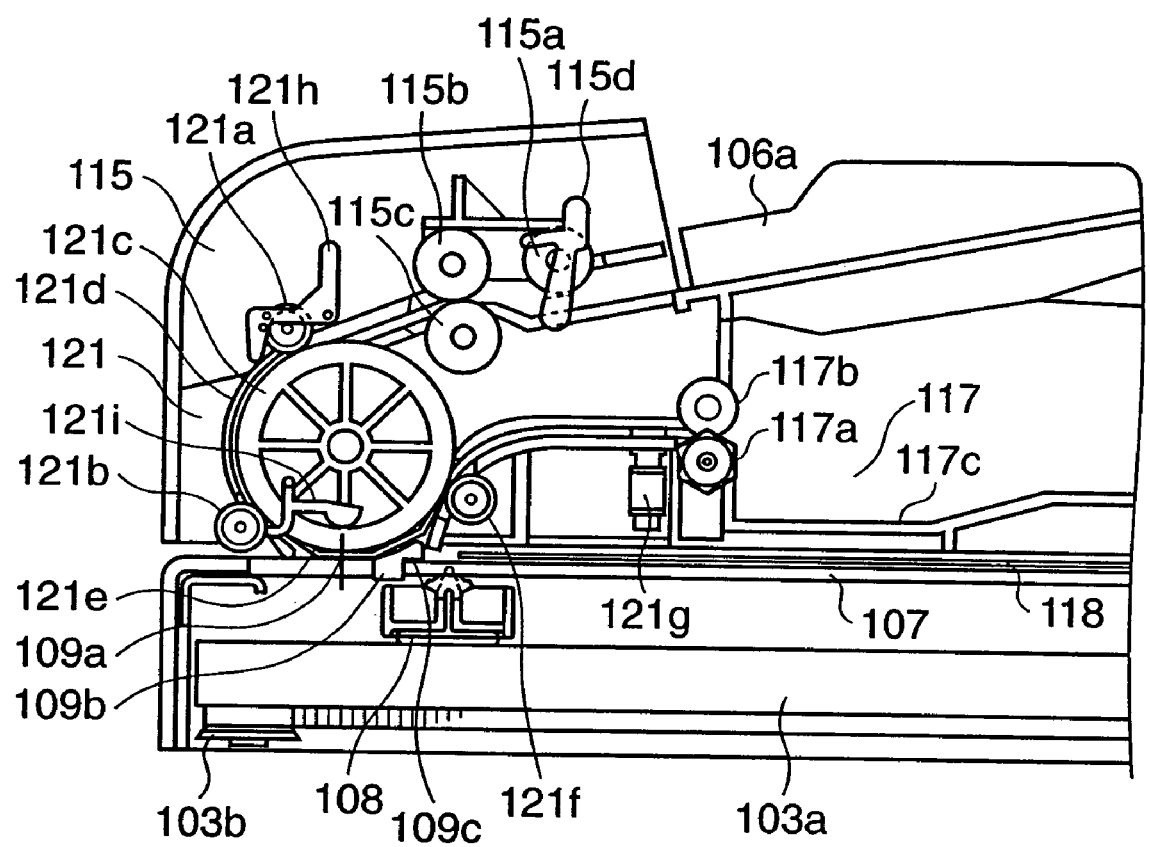
FIG. 3 is a schematic view showing an internal arrangement of an image reading section according to the embodiment of the present invention.

This embodiment will exemplify a facsimile apparatus to which an image sensor unit and an image reading apparatus having the image sensor unit according to the present invention are applied. FIG. 1 is a perspective view showing the section of the facsimile apparatus of the present invention when viewed from the front, FIG. 2 is a perspective view of the facsimile apparatus, and FIG. 3 is an enlarged perspective view of an image reading section.

The outline of the facsimile apparatus will be described below. Referring to FIGS. 1, 2, and 3, reference numeral 101 denotes an apparatus main body; 102, an ADF (Automatic Document Feeder) for stacking a plurality of sheet documents D and separating and conveying them one by one; 103, an image reading section for reading image information on the surface of the sheet document D or a book document on the platen glass; 104, a printing apparatus main body comprises an electrophotographic printer using an LED array; 105, an operation section made up of a display and input keys; 106, a document table; 107, platen glass; 108, a movable image sensor unit; and 109, feed reading glass.

Reference numeral 110 denotes an LED head unit; 111, an image forming section; 112, a cassette paper feed section; 113, a print sheet discharge section adapted to stack a plurality of sheet media P on the printing apparatus main body 104; 114, a cartridge cover; 115, an ADF separation section; 116, a reverse surface reading sensor section; 117, a document discharge section; 118, a document press plate for pressing a book document; 119, a connection section between the image reading section 103 and the printing apparatus main body 104; 120, a controller of the facsimile apparatus; 121, a sheet document conveyance section; 122, a two-side conveyance section cover; 123, a conveyance direction selector; 124, a registration conveyance section; 125, a multi-paper (MP) feed section disposed inside the printing apparatus main body 104; and 150, a two-side conveyance section.

Book document reading will now be described.

The ADF 102 is attached to the image reading section 103 to be pivotal about hinge portions 102a. The hinge portions 102a comprises right and left hinge portions disposed on the rear surface side (the left hinge portion is not illustrated). The image reading section 103 can be opened by pulling the front side of the ADF 102 upward (see a double-headed arrow in FIG. 2). The hinge portions 102a can stop the ADF 102 at a predetermined angle (e.g., 70°) by a combination of dampers, cams, and spring members. When the ADF 102 is kept open, a document can be set on the platen glass 107.

The movable image sensor unit 108 irradiates the image information surface of a document by light sources each comprises an LED and a plastic light guide. The sensor unit 108 forms light reflected by the image information surface into an image on a one-dimensional light-receiving element array through a cylindrical rod lens (tradename), thereby reading the image information.

Figure 4A:
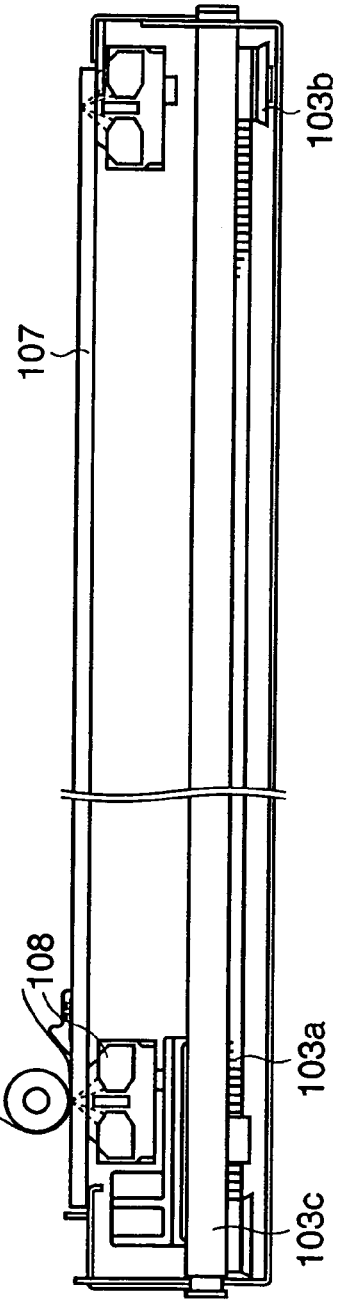
FIGS. 4A and 4B are schematic views showing the internal arrangement of the image reading section according to the embodiment of the present invention.
Figure 4B:
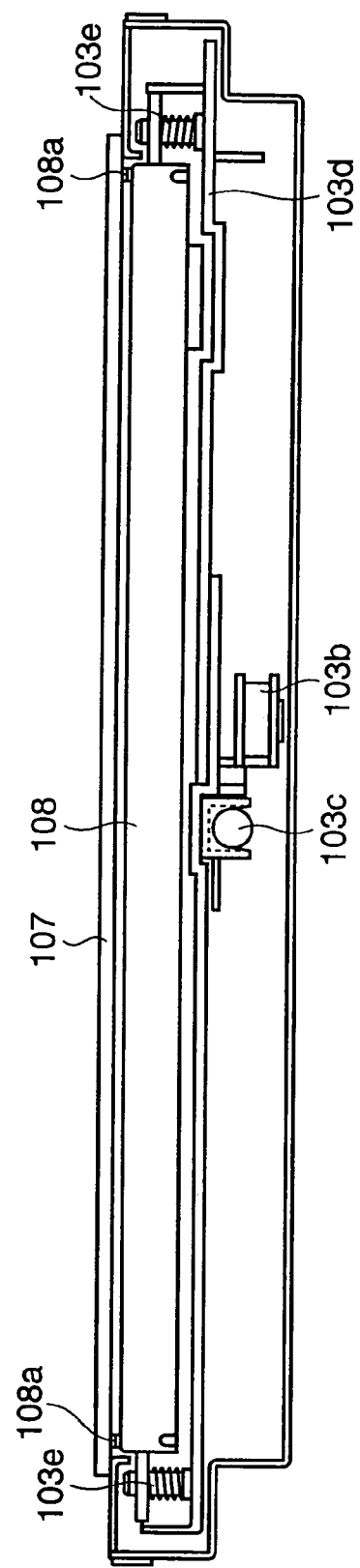

FIG. 4A is a schematic view showing the internal arrangement of the movable image sensor unit 108 along the subscanning direction, and FIG. 4B is a schematic view showing the internal arrangement along the main scanning direction.

As shown in FIG. 4A, the movable image sensor unit 108 is movable along a guide shaft 103c in the right-and-left direction (subscanning direction). The movable image sensor unit 108 can be moved to a desired position by a timing belt 103a, driving pulley 103b, and driving motor (not shown). In this case, the movable image sensor unit 108 is supported on the guide shaft 103c through a carriage 103d shown in FIG. 4B and biased upward by springs 103e. Spacers 108a are interposed between the image sensor unit 108 and the platen glass 107. The image sensor unit 108 is adapted to read the image of a document placed on the platen glass 107 at a constant velocity within a predetermined range from a book reading range start position 107a to a book reading range end position 107b shown in FIG. 1.

A white sheet 109c is disposed on the lower surface of a jump 109b extending above the platen glass 107. When the reading position of the image sensor unit 108 is located below the white sheet 109c, the image sensor unit 108 acquires shading correction data. In book scan, since the image sensor unit 108 passes below the jump 109b for every scan, shading correction can be performed for every scan. This is effective to reduce the influence of the light source of the movable image sensor because the light amount of the light source changes over the ON time.

The document press plate 118 comprises a white sheet and sponge laminate to prevent the document placed on the platen glass 107 from floating. A front end 118a of the document press plate 118 extends to the left side of the book reading range start position 107a, and a rear end 118b of the document press plate 118 extends to the right side of the book reading range end position 107b.

Reading of the sheet document D will be described below.

The ADF separation section 115 comprises a pickup roller 115a disposed vertically movable by an actuator (not shown), a separation roller 115b, and a retard roller 115c brought into contact with the separation roller 115b to rotate in a direction opposite to that of the separation roller 115b.

The pickup roller 115a is moved downward to press the sheet documents D stacked on the document table 106 with their upper (obverse) surfaces facing upward. Sheet documents are fed between the separation roller 115b and the retard roller 115c and are separated one by one by the separation roller 115b which is in tight contact with the regard roller 115c. The sheet document D is guided by a document guide 121d and conveyed along a U-turn paper path by separation conveyance rollers 121a and 121b pressed by a press spring (not shown) and a pressed reading conveyance roller 121c.

The document is then conveyed up to the feed reading glass 109. The sheet document D is pressed and brought into tight contact with the feed reading glass 109 by a sheet document press plate 121e pressed by a biasing spring (not shown). In this state, the image information on the upper surface of the sheet document D is read on the sheet document reading position 109a. The image sensor unit 108 is moved to the sheet document reading position 109a. The sheet document D is returned to the ADF 102 side by the jump 109b. The sheet document D is then conveyed by the reading conveyance roller 121c pressed against the reading conveyance roller 121f pressed by a press spring.

The document is discharged onto a document discharge tray 117c by a discharge roller 117b which is in tight contact with a discharge roller 117a pressed by a press spring. A "read" stamp 121g is disposed upstream of the discharge roller 117b, and the sheet document D can be sealed with the "read" stamp 121g.

The document table 106 is fixed to the ADF 102. A slider 106a slidable in a direction perpendicular to the conveyance direction of the sheet document D (i.e., widthwise direction of the sheet document D) is disposed on the document table 106. The slider 106a can align the two sides of the sheet documents D stacked on the document table 106. A document length sensor 106b is arranged on the document table 106 to allow detecting the length of the set sheet document D. The presence/absence and width of the sheet document D can be detected by a plurality of document width sensors 115d arranged on the ADF separation section 115 along the widthwise direction of the sheet document D. The document size and set direction can be detected by a combination of detection outputs from the document width sensors 115d and document length sensor 106b.

A document feed sensor 121h and document end sensor 121i are arranged on the sheet document conveyance section 121. The document feed sensor 121h detects whether the sheet document D is fed from the ADF separation section 115 and whether the trailing end of the sheet document D has passed. The document end sensor 121i detects whether the leading and trailing ends of the sheet document D have passed. Outputs from the document end sensor 121i are used for timing control.

The image sensor unit 108 described above according to the present invention irradiates a document with a light source, and makes light reflected by the document incident on a sensor through an imaging optical system, thereby reading the document image.

Figure 5:
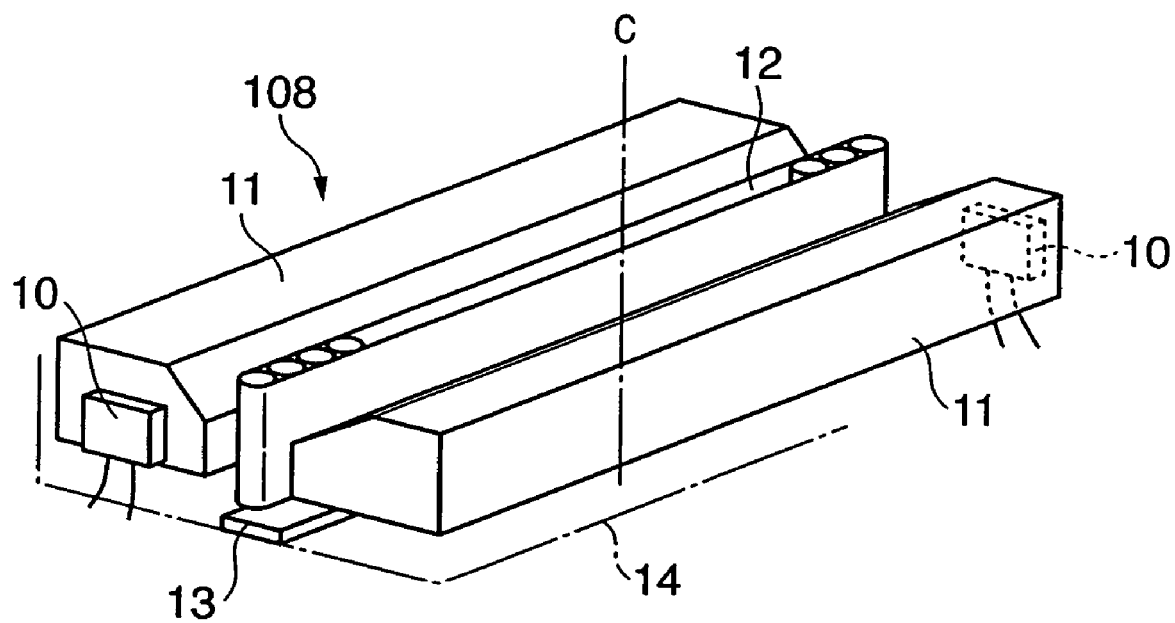
FIG. 5 is a perspective view showing the arrangement of an image sensor unit according to the embodiment of the present invention.

FIG. 5 shows the detailed arrangement of the image sensor unit 108 according to the first embodiment. The image sensor unit 108 includes LEDs 10 as light-emitting elements serving as light sources, and light guides 11 for guiding light from the LEDs 10 to a document. The pair of light guide sources are disposed along the two sides of a cylindrical rod lens array 12 forming the imaging optical system. A light-receiving element array 13 is disposed immediately below the cylindrical rod lens array 12. All the image sensor constituent members are laid out in a frame 14.

Each LED 10 is fixed to one of the longitudinal ends of the light guide 11. In the illustrated arrangement, one LED is fixed to one end of one light guide 11, and another LED is fixed to the other end of the other light guide 11. The LEDs 10 are fixed to opposing ends of the two light guides 11, respectively, and point-symmetrical about a central axis C. The central axis C is an axis parallel to the axis of the cylindrical rod lens array 12 as the imaging optical system, which extends from almost the center of the one-dimensional light-receiving array 13.

Figure 6:
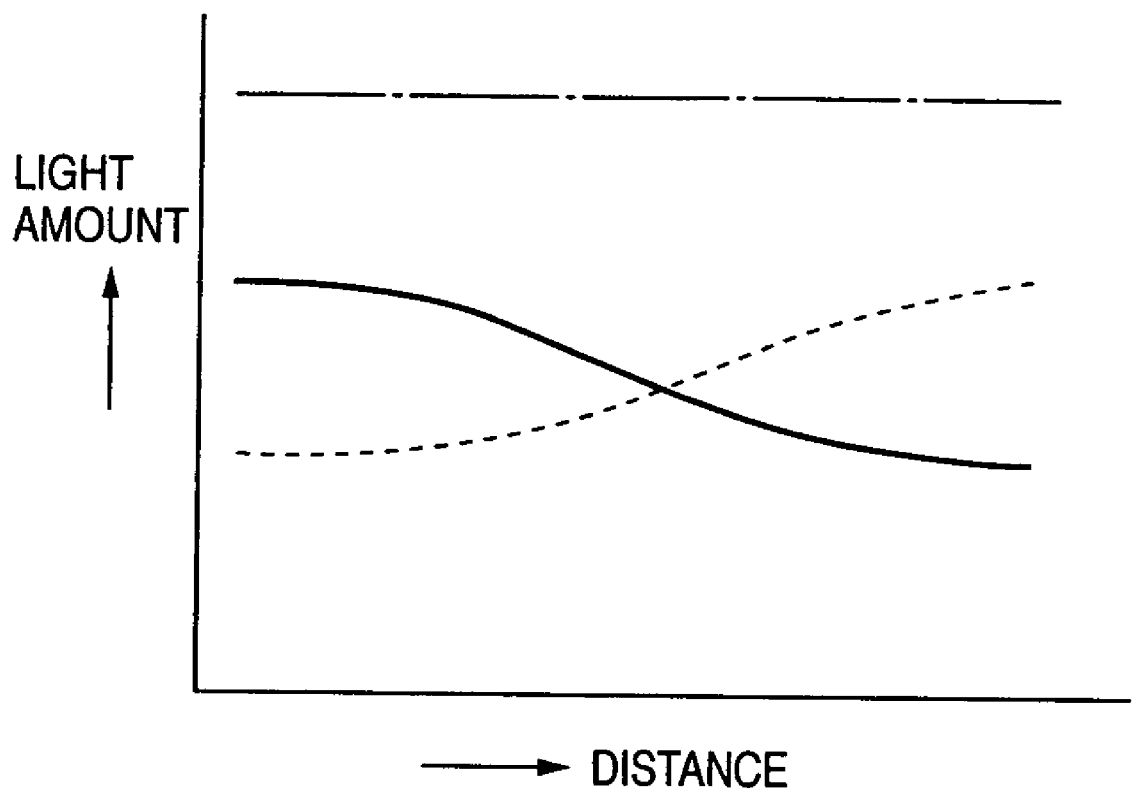
FIG. 6 is a graph showing a light amount distribution of a light guide source according to a first embodiment of the present invention.

FIG. 6 shows the light amount distribution of a light source using the light guides 11 in the image sensor unit 108. Referring to FIG. 6, the light amount distribution of one light guide 11 using the distance from the corresponding LED 10 as a reference is indicated by a solid line. The light amount distribution of the other light guide 11 is indicated by a dash-line. The total light amount distribution of the image sensor unit 108 is the sum of the light amounts of the LEDs 10, as indicated by a dot-dash-line. That is, the light amount increases and is averaged, as shown in FIG. 6.

The LEDs 10 are fixed to the opposite ends of the two light guides 11, and the light guide sources complement each other to obtain a uniform light amount distribution, thereby obtaining an excellent read image free from irregularity. In addition, since the two LEDs 10 are spaced apart from each other, heat generated upon operation of the LEDs can be properly dissipated. The optimal light amount of the light amount can be maintained, and the service life of the LED can be prolonged. The LEDs 10 are disposed in point symmetry with respect to the central axis C passing almost the center of the sensor array. For this reason, the barycentric position of the image sensor unit 108 coincides with the central axis C to assure the balance and stability in movement. This assures smooth movement of the image sensor unit 108. From this viewpoint as well, an excellent read image can be obtained.

Figure 7:
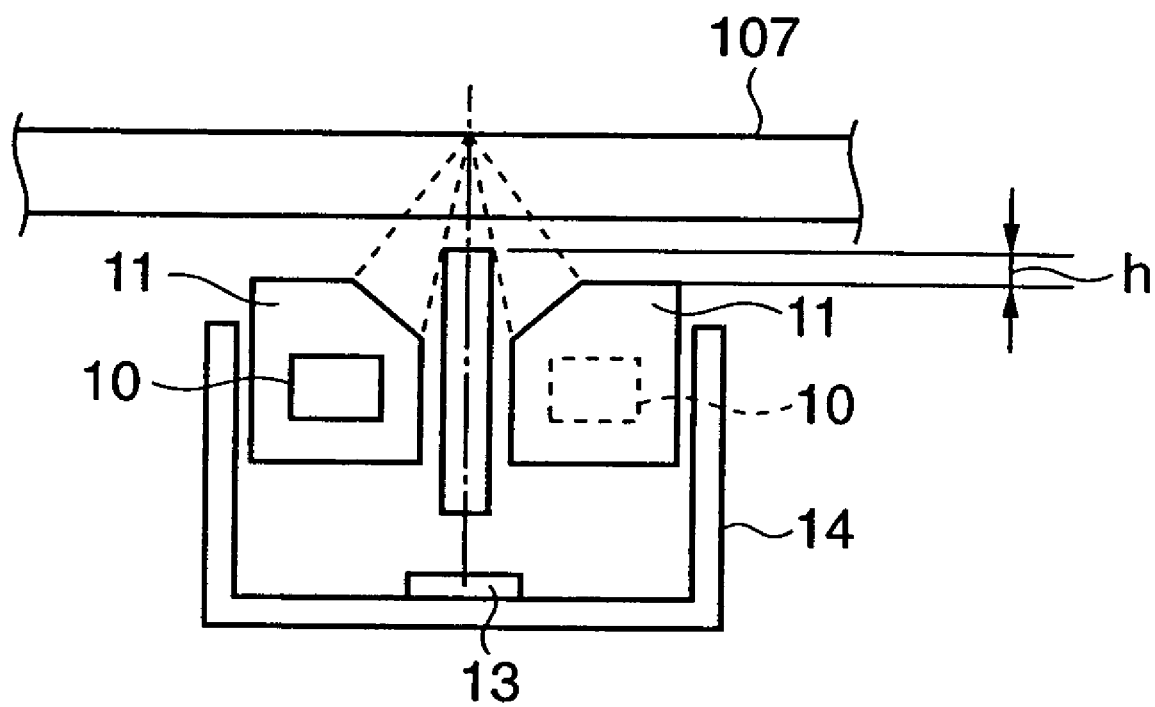
FIG. 7 is a sectional view showing an arrangement of an image sensor unit according to the first embodiment of the present invention.

Light emitted from each LED 10 repeats reflection in the corresponding light guide 11, propagates and emerges from the entire length of the light guide 11. Exit light from the light guide 11 irradiates a book document on the platen glass 107, as shown in FIG. 7. Each reflected light is incident on the light-receiving element array 13 through the cylindrical rod lens array 12.

In particular, in the first embodiment, as shown in FIG. 7, the level of the light guide 11 is set lower than that of the cylindrical rod lens array 12. A step h is formed between the upper surface of the light guide 11 and the top of the cylindrical rod lens array 12. The image sensor unit 108 has no cover glass, and the light guides 11 are kept exposed.

Figure 8:
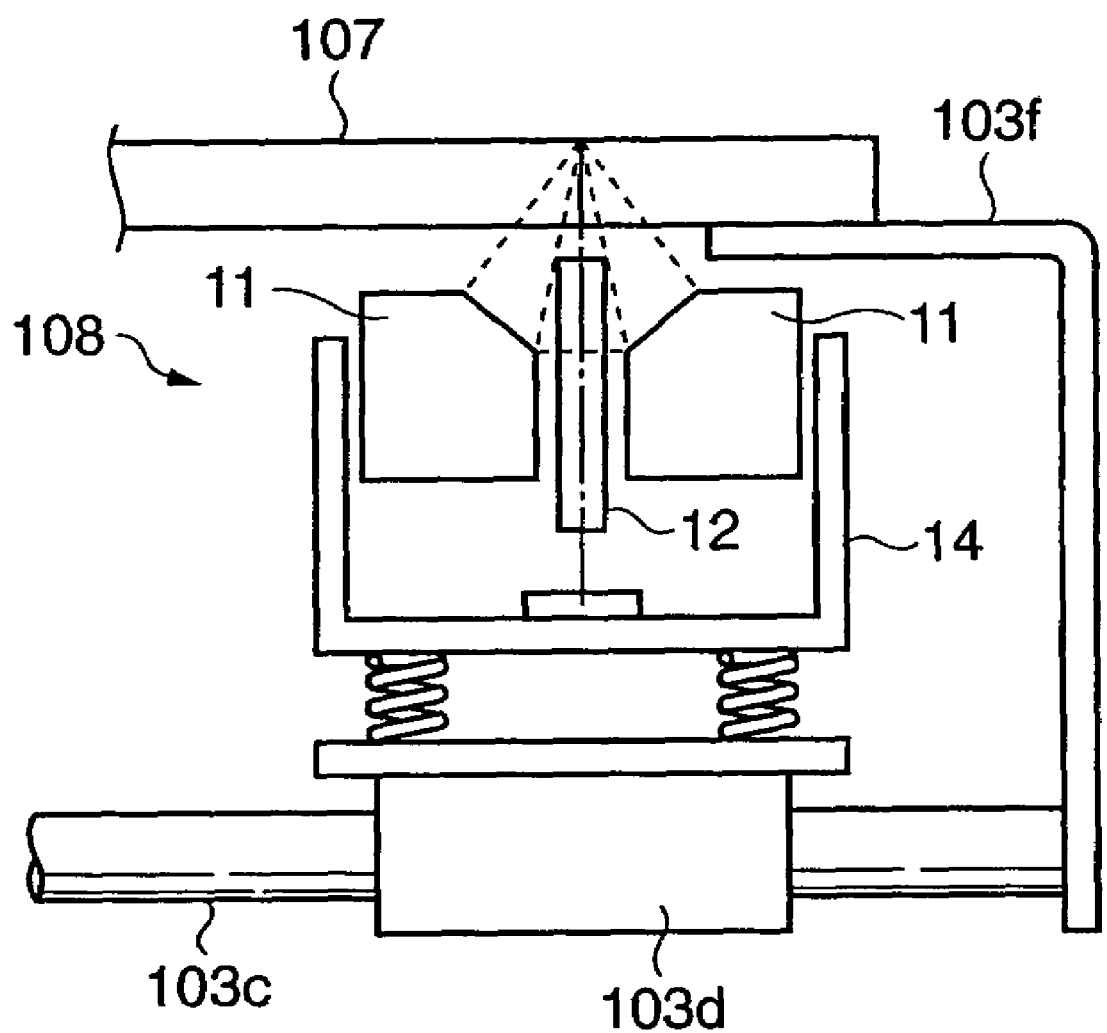
FIG. 8 is a view showing the image sensor unit at the image reading start or end point according to the first embodiment of the present invention.

As described above, since the light guides 11 are set lower than the cylindrical rod lens array 12 and the sensor unit has no cover glass, part of the image sensor unit 108 can move even below a frame 103f, as shown in FIG. 8. A portion of the frame 103f which corresponds to the spacers 108a (FIG. 4B) has a notch (not shown) for bypassing the spacer 108a. The internal space of the frame 103f can be efficiently used to make the portion around the image reading section substantially compact.

As described above, according to the first embodiment, the document can be irradiated in an excellent state, and the image reading apparatus can be made compact.

Note that the step h need not be formed between the level of the cylindrical rod lens array 12 and the level of the light guides 11, as shown in FIG. 7.

Figure 9A:
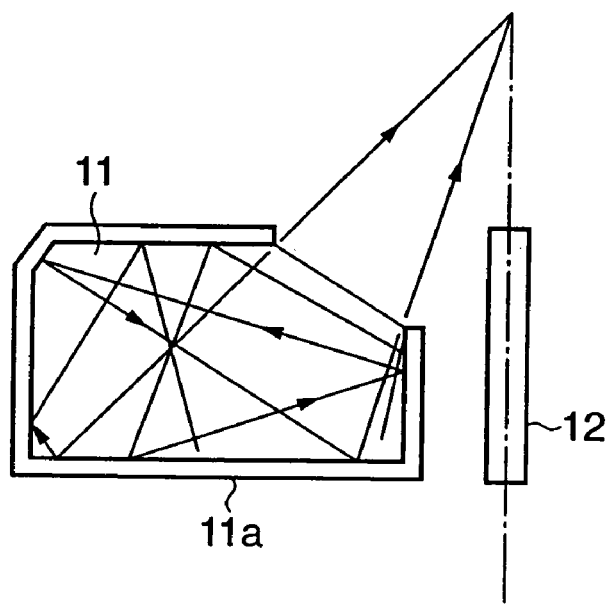
FIGS. 9A and 9B are views for explaining light irradiation action of the light guide and the external light reflection action of an upper surface.
Figure 9B:
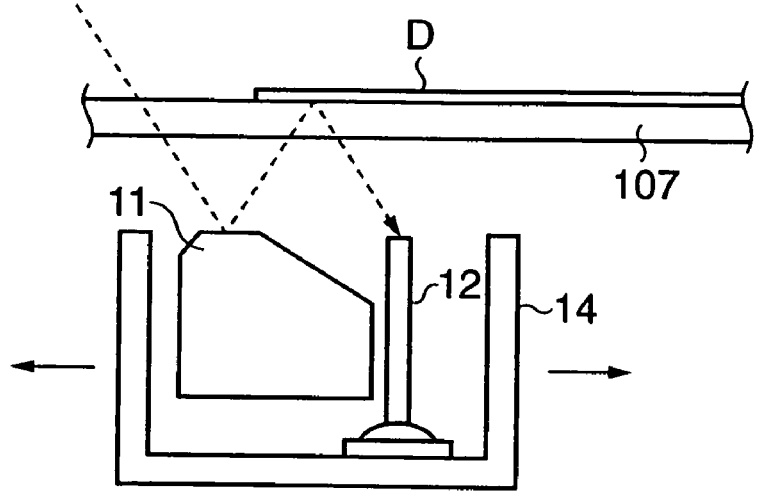

A white surface-treated portion 11a is formed on the light guide 11 of the image sensor of this type except the light irradiation opening, as shown in FIG. 9A. This white surface-treated portion 11a internally reflects light from the light-emitting element and allows focusing the light. In this case, when the document D is read at a predetermined distance from the light guide 11, as shown in FIG. 9B, external light and scattered light from the light guide 11 itself may be reflected by the surface-treated portion 11a, document D, or shading correction plate. This reflected light is incident on the sensor through the lens array 12 as excessive light to cause image density irregularity.

Figure 10A:
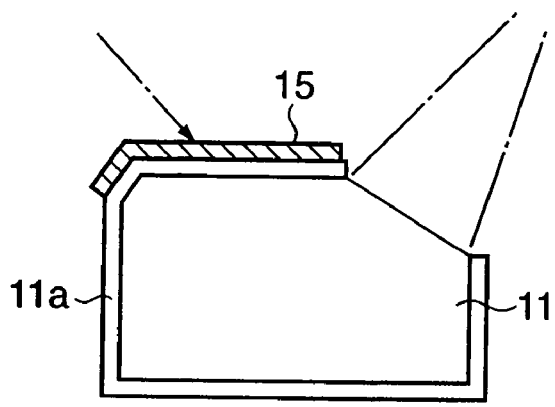
FIGS. 10A to 10C are views showing an antireflection arrangement for a light guide of an image sensor unit according to the first embodiment of the present invention.
Figure 10B:
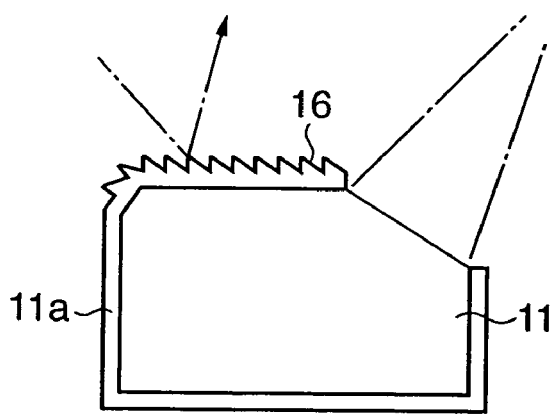
Figure 10C:
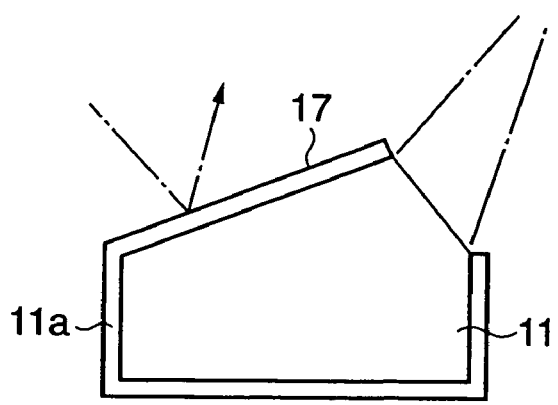

The above-mentioned reflected light is prevented from entering the reading surface. FIGS. 10A to 10C show a method of preventing reflection on the reading surface. Referring to FIG. 10A, a black (matte) surface-treated portion 15 is formed on the upper surface of the light guide 11.

The surface-treated portion 15 can prevent external light incident in opening the press plate from reflecting on the surface of the light guide 11. This can prevent fog caused by shading correction error and can assure optimal shading correction. The surface-treated portion 15 also prevents a phenomenon in which incident light outside a small-sized document is reflected by the light guides and the reflected light illuminates the document surface to change the density on the document surface, that is, a so-called excessive bright phenomenon in book reading of the document while keeping opening the ADF (press plate). The surface-treated portion 15 can be formed in a variety of forms such as coating in black or adhesion of a black sheet.

As shown in FIG. 10B, the upper surface of the light guide 11 may be roughened or formed with fine saw-toothed portions to obtain a surface-treated portion 16. In this manner, the physical properties of the upper surface can reflect external light or the like not to enter the reading surface.

The upper surface of the light guide 11 may be formed into an inclined surface 17 at a predetermined angle, as shown in FIG. 10C. This inclined surface 17 can prevent external light or the like from being reflected on the reading line.

In the first embodiment, the reflected light is prevented from entering the reading surface. Such a method is particularly effective when the level of the light guide 11 is made lower than that of the cylindrical rod lens array 12 as shown in FIG. 7.

As has been described above, a pair of light sources are arranged on the two sides of an imaging optical system in an image sensor unit of this type. The light source comprises a light-emitting element and a light guide for guiding light from the light-emitting element to a document, thereby achieving high-speed scanning with a sufficient light amount at low cost. In addition, when an image is to be read from a document on which a photograph is adhered, a linear shadow which conventionally appeared in the read image can be prevented. In addition, light-emitting elements are fixed to the opposing longitudinal ends of a pair of light guides to obtain a uniform light amount distribution, thereby obtaining an excellent read image free from irregularity. This arrangement can improve heat-dissipating properties to assure the optimal light amount of the light source and its long service life. In addition, the balance and stability in movement of the image sensor unit are assured to realize smooth operation.

<Second Embodiment>

The second embodiment will be described below. The basic arrangement is the same as the first embodiment described with reference to FIGS. 1 to 7, and a detailed description thereof will be omitted. However, step h, shown in FIG. 7, between the levels of a cylindrical rod lens 12 and a light guide 11 is not necessarily formed.

In the second embodiment, the light amount peak of a light source is set slightly higher than the central focal position of an imaging optical system. More specifically, as shown in FIGS. 11A and 11B, the light amount peak of exit light beams 35 and 36 from the light guides 11 is set slightly higher than a document support surface 37 of platen glass 107 that is a transparent member which supports the document.

Referring to FIG. 11A, the exit light beams 35 and 36 from the respective light guides 11 cross near the support surface 37 of the platen glass 107 to form an almost rectangular beam crossing region 38. An almost central portion of the beam crossing region 38 has a light amount peak 39. An effective light amount range 40 is present around the light amount peak 39. The central focal position or support surface 37 is included in the effective light amount range 40.

FIG. 11B shows a light amount distribution around the beam crossing region 38. The height of the beam crossing region 38 is about 1 to 2 mm. The beam crossing region 38 can assure a relatively large light amount. The light amount abruptly decreases above or below the beam crossing region 38. The light amount gradually decreases away from the light amount peak 39 in the beam crossing region 38. The light amount at the upper or lower end of the beam crossing region 38 decreases to about 95%. The effective light amount range can assure a light amount of about 98%, which is sufficient in practice.

In an image sensor unit 108 of the second embodiment, even if a document floats from the support surface 37 due to some reason during reading the document on the platen glass 107, the reading surface of the document can fall within the effective light amount range 40. In this case, when the document floats at the position of the light amount peak 39, a maximum light amount can be assured. Since a sufficient and necessary light amount for image reading can be obtained in the effective light amount range 40, optimal reading can be assured for the floating document.

When the document does not float but is placed in contact with the support surface 37 without any gap, the document reading surface is located below the light amount peak 39. Even in this case, since the reading surface falls within the effective light amount range 40, no problem is posed in practice.

As described above, according to the second embodiment, even if the document floats from the document table in the contact type image sensor unit, the light amount peak can be properly set to always assure a necessary and sufficient light amount. An appropriate measure is taken for variations in light amount upon document floating, thereby always obtaining an excellent read image.

<Third Embodiment>

The third embodiment will now be described. The basic arrangement is the same as the first embodiment described with reference to FIGS. 1 to 4, and a detailed description thereof will be omitted.

The third embodiment will exemplify the arrangement of another image sensor unit 108.

Figure 12:
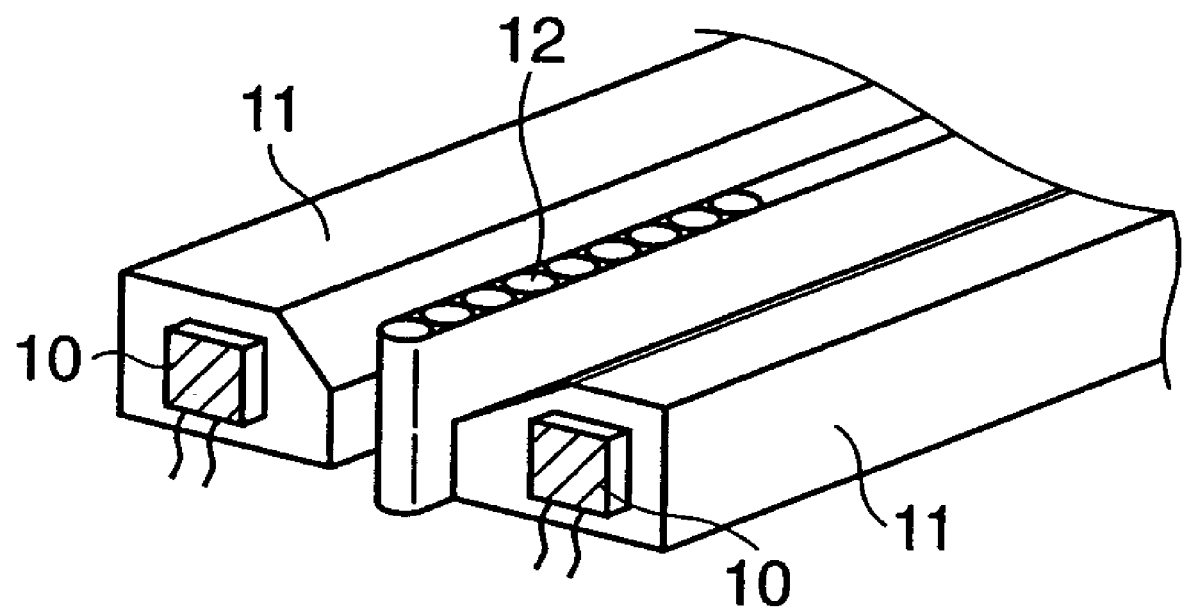
FIG. 12 is a partial perspective view showing an arrangement of an image sensor unit according to a third embodiment of the present invention.

FIG. 12 shows the arrangement of this image sensor unit 108 according to the third embodiment. A pair of light guide sources are formed along the two sides of the cylindrical rod lens array 12. In this case, LEDs 10 are fixed to the longitudinal ends of the light guides 11 on the same side.

Figure 13:
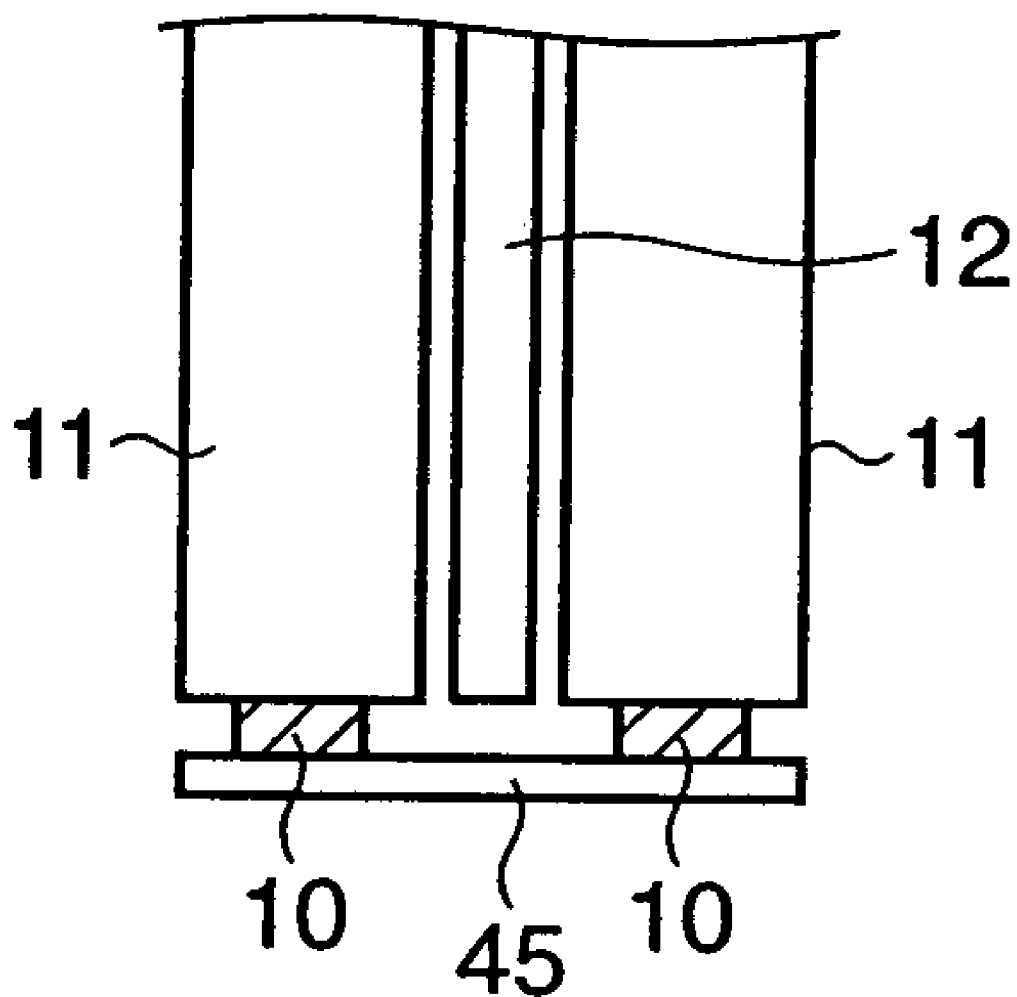
FIG. 13 is a partial plan view showing an arrangement around the light-emitting element of the image sensor unit according to the third embodiment of the present invention.
Figure 14:
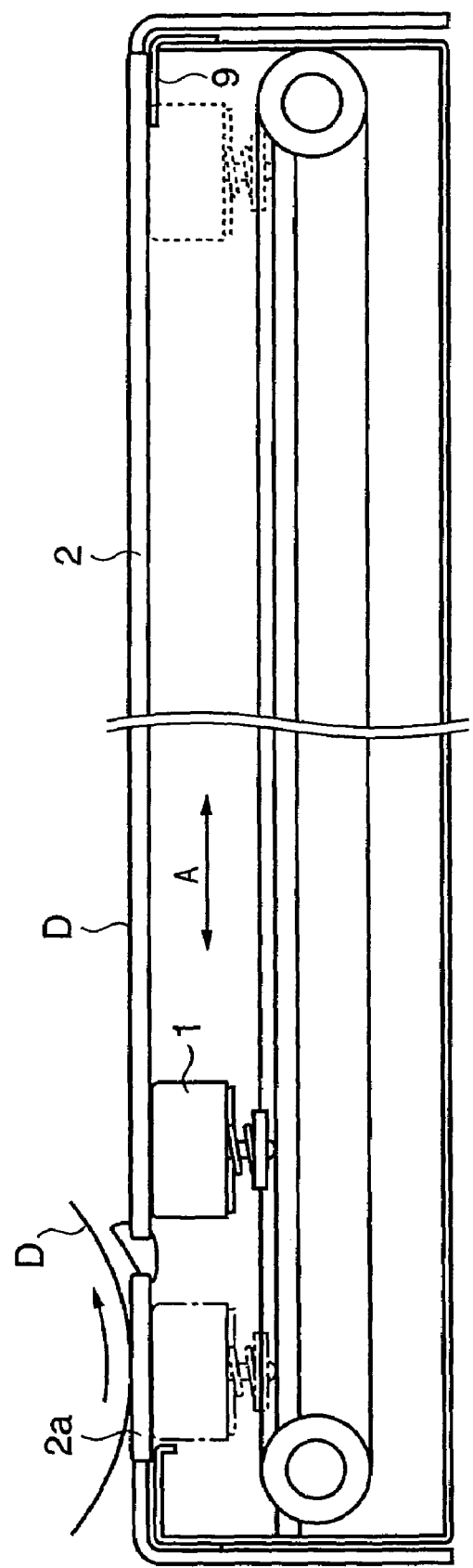
FIG. 14 is a view showing an internal arrangement of an image reading section in a conventional image reading apparatus.
Figure 15A:
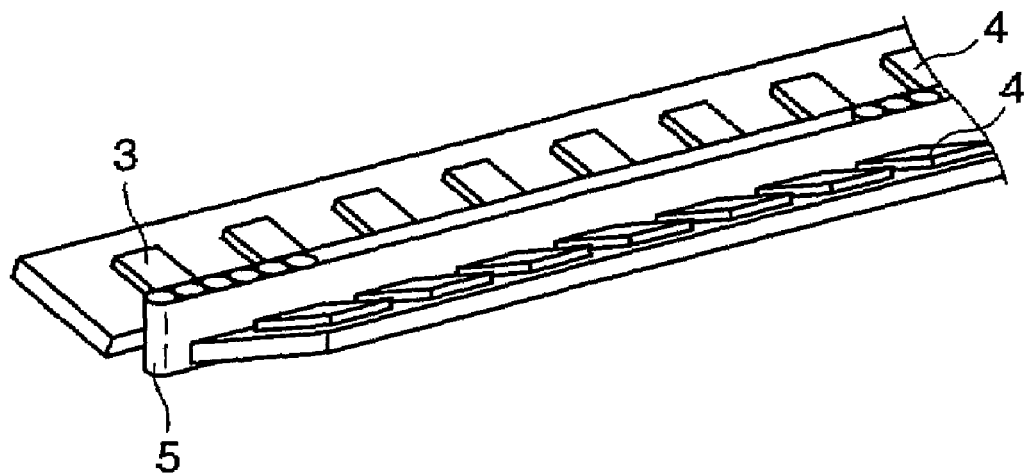
FIGS. 15A and 15B are views showing the arrangement of a conventional image sensor unit.
Figure 15B:
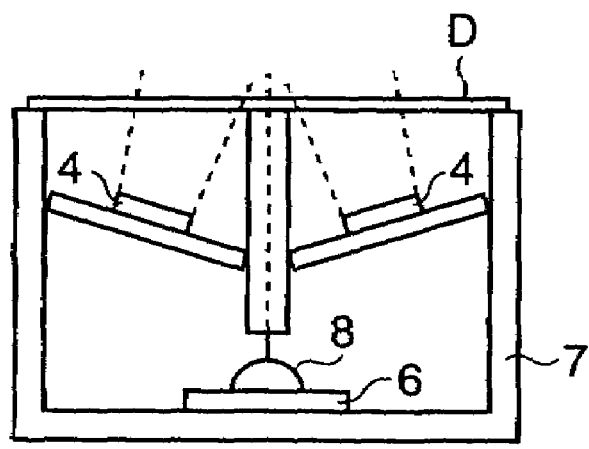
Figure 16A:
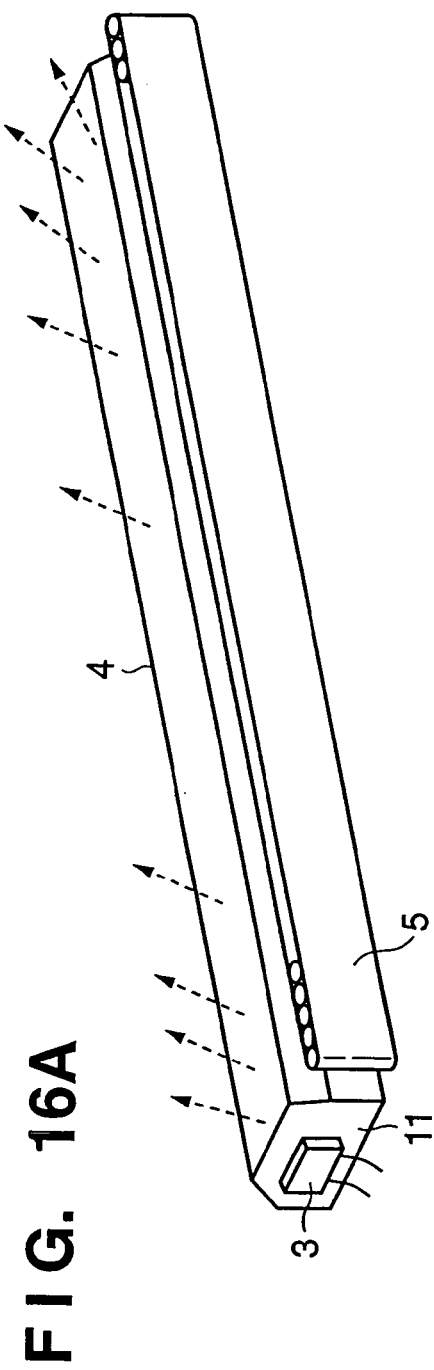
FIGS. 16A and 16B are views showing the arrangement of another conventional image sensor unit.
Figure 16B:
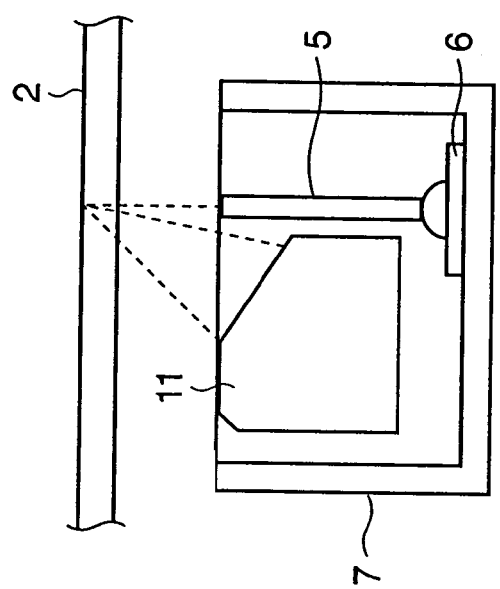
Figure 17:
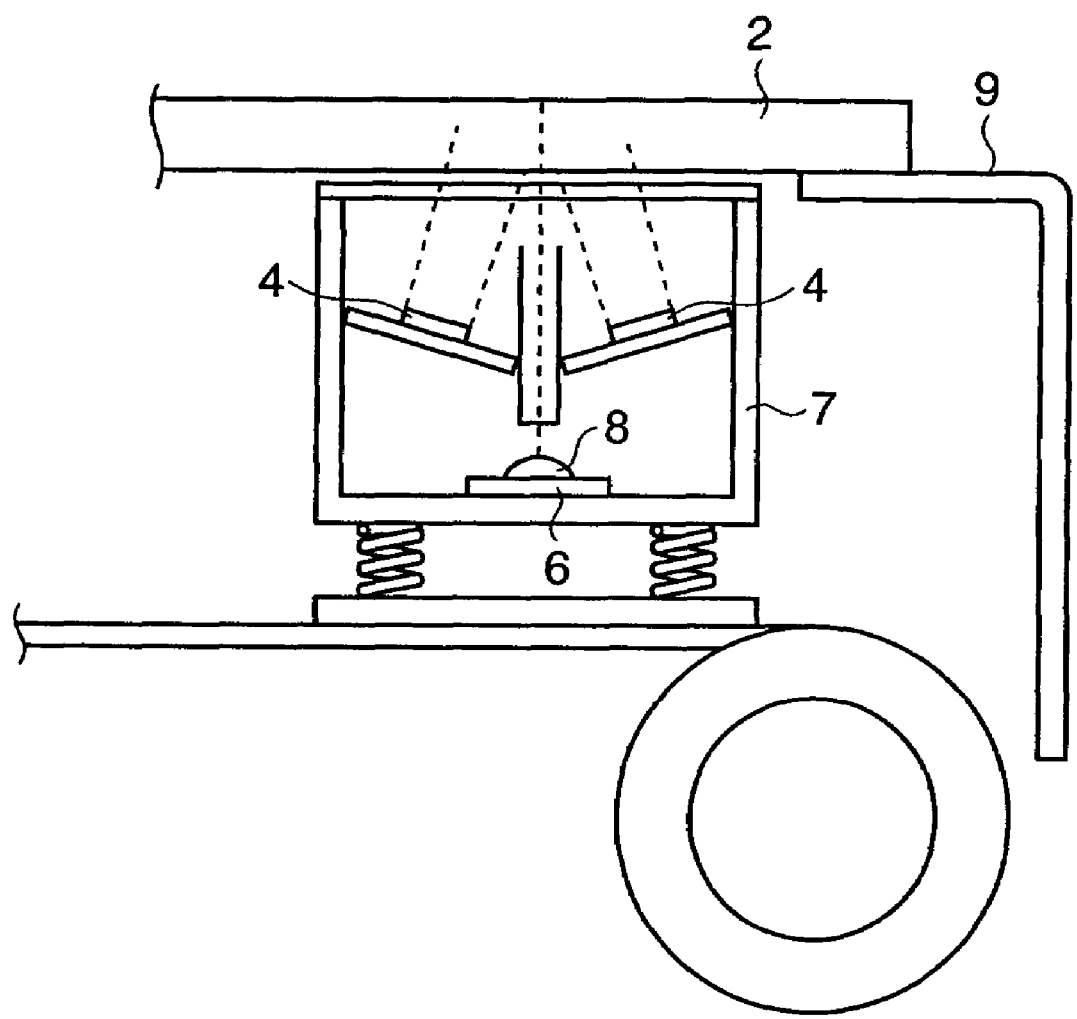
FIG. 17 is a view showing a conventional image sensor unit at the image reading start or end point.
Figure 18:
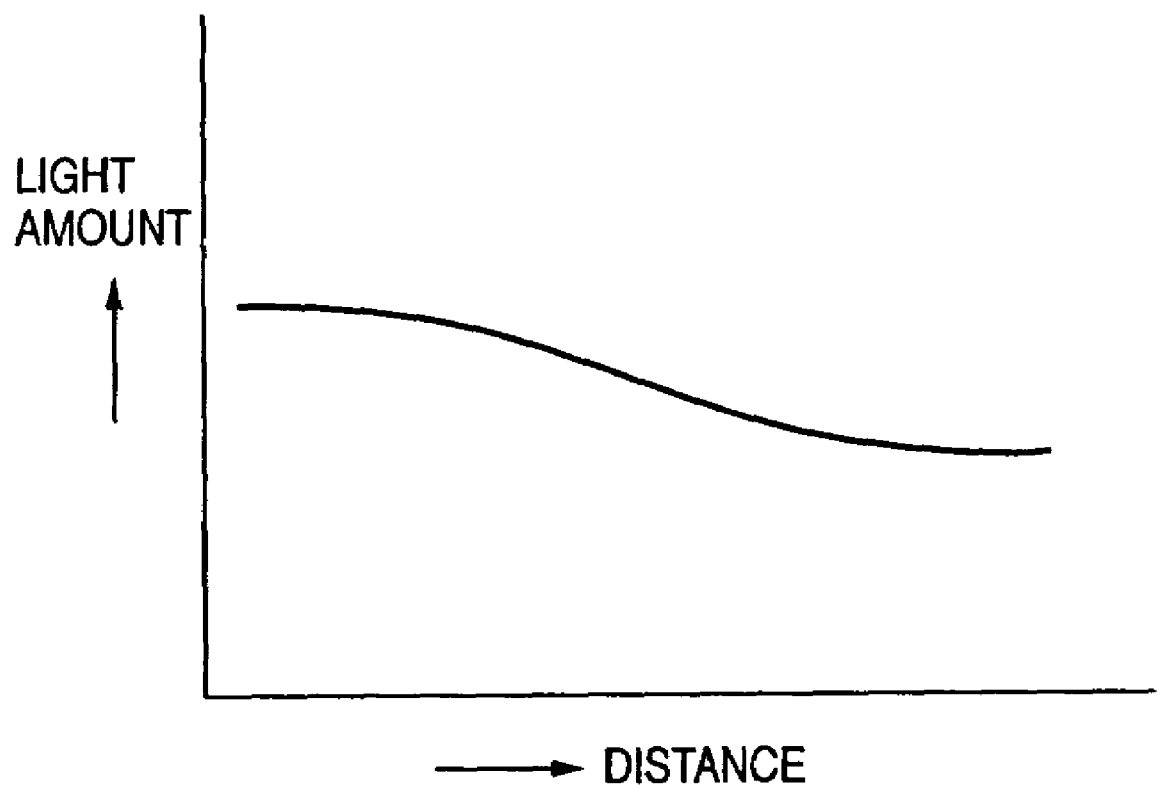
FIG. 18 is a view showing the light amount distribution of a light guide source in a conventional sensor unit.

The LEDs 10 are mounted on circuit boards. When the LEDs 10 are fixed to the light guides 11 on the same side, the light boards can be integrated into a single circuit board 45, as shown in FIG. 13. Only one circuit board 45 is used for two light sources, thereby simplifying the structure and reducing the cost.

The above embodiments have exemplify the facsimile apparatuses as the image reading apparatuses. However, the present invention is also applicable to a scanner printer or digital copying machine. The light-emitting elements are elements of a single color or a plurality of colors. To implement a full-color reading apparatus, the light-emitting elements comprise R, G, and B elements.

The present invention is not limited to the above embodiments and various changes and modifications can be made within the spirit and scope of the present invention. Therefore to apprise the public of the scope of the present invention, the following claims are made.

What is claimed is:

1. An image sensing unit comprising:
   an illumination section including a long light guide having a length adapted to illuminate across the width of a document and a light source provided at the end of said light guide;
   image sensing elements arranged along the length of said light guide adapted to convert an optical image of the document into an electrical signal;
   a plurality of cylindrical lenses arranged along the length of said light guide adapted to focus the optical image on said image sensing elements; and
   a frame adapted to integrally hold said illumination section, said image sensing elements, and said lenses,
   wherein a surface of said light guide on the document side, except an irradiation part, is inclined downwardly with respect to a lower surface of the light guide as a position of the surface recedes from said irradiation part in the direction perpendicular to the length direction so as to prevent light other than the light, irradiated from the irradiation part, from irradiating a reading position of the document to be read by said image sensing elements.

2. The unit according to claim 1, wherein said illumination section comprises a pair of illumination sections so disposed as to sandwich said lens.

3. The unit according to claim 1, wherein a distance from said image sensing element to the irradiation part of the surface of said light guide on the document side is shorter than a distance from said image sensing element to ends of said lenses on the document side.

4. The unit according to claim 1, wherein said frame is open on the document side.

5. An image reading apparatus comprising:
   the image sensor unit defined in claim 1; and
   a moving mechanism for moving a relative position between the image sensor unit and the document,
   wherein the document is scanned by relative movement between the image sensor unit and the document.

6. The apparatus according to claim 5 further comprising:
   a transparent plate for placing and supporting the document, and
   a support portion for supporting an end portion of said transparent plate,
   wherein part of the image sensor unit is capable of being placed below said support portion.

* * * * *